United States Patent [19]

Jones et al.

[11] 3,890,603

[45] June 17, 1975

[54] ASSOCIATIVE STORE

[75] Inventors: John W. Jones, Winchester; John F. Sears, Eastleigh; Keith G. Taylor, Chandlers Ford, all of England

[73] Assignee: International Business Machines Corporation, Armonk, N.Y.

[22] Filed: Mar. 26, 1974

[21] Appl. No.: 454,982

[52] U.S. Cl. .......... 340/173 AM; 340/172.5

[51] Int. Cl. .......... G11c 15/00

[58] Field of Search .......... 340/173 AM

[56] References Cited

OTHER PUBLICATIONS

IBM Tech. Dis. Bul., Vol., 14, No. 4, Sept. 1971, p. 1056, "Programable Logic Chip," M. S. Axelrod et al.

IBM Tech. Dis. Bul., Vol. 15, No. 10, Mar. 1973, pp. 3181-3182, "Associative Processor," J. Jones et al.

*Primary Examiner*—Terrell W. Fears
*Attorney, Agent, or Firm*—Herbert F. Somermeyer

[57] ABSTRACT

An associative store, particularly designed for performance of logic by table-look-up, has fixed search and read fields. Input to the search field is through an encoder which converts sets of plural binary inputs into one out of K set of drive signals, where K is an integer related to the number of bits in each set. Output signals from the read field are decoded by exclusive-ors corresponding ordered bit positions of two read arrays. The search field is either conventionally addressed for loading or read-only.

7 Claims, 6 Drawing Figures

| | SEARCH ARGUMENT | | | | FUNCTION |
|---|---|---|---|---|---|
| | A B | A $\bar{B}$ | $\bar{A}$ B | $\bar{A}$ $\bar{B}$ | |
| SEARCH FIELD CONTENTS | 0 | 0 | 0 | 0 | TRUE |
| | 0 | 0 | 0 | 1 | A OR B |
| | 0 | 0 | 1 | 0 | A OR $\bar{B}$ |
| | 0 | 0 | 1 | 1 | A |
| | 0 | 1 | 0 | 0 | $\bar{A}$ OR B |
| | 0 | 1 | 0 | 1 | B |
| | 0 | 1 | 1 | 0 | A ≡ B |
| | 0 | 1 | 1 | 1 | A AND B |
| | 1 | 0 | 0 | 0 | $\bar{A}$ OR $\bar{B}$ |
| | 1 | 0 | 0 | 1 | A EX OR B |
| | 1 | 0 | 1 | 0 | $\bar{B}$ |
| | 1 | 0 | 1 | 1 | A AND $\bar{B}$ |
| | 1 | 1 | 0 | 0 | $\bar{A}$ |
| | 1 | 1 | 0 | 1 | $\bar{A}$ AND B |
| | 1 | 1 | 1 | 0 | $\bar{A}$ AND $\bar{B}$ |
| | 1 | 1 | 1 | 1 | FALSE |

ASSOCIATIVE STORE

This invention relates to an associative store, that is, a store in which data is accessed on the basis of content rather than position within the store. A search argument defined over a search field is compared with the content of the search field of each word storage location in the store and, if the search argument matches the content of the search field, the word location is selected for accessing.

Due to the miniaturisation of electronic logic circuitry such as is found in digital computers many hundreds of circuits are manufactured simultaneously on the surface of a silicon chip measuring of the order of one centimetre square. In such manufacture there are two sources of wastage. First, the manufacturing process involves several scores of manufacturing steps each of which must be extremely accurately performed. Many of the steps involve physical processes in which it is virtually impossible to achieve perfect control of the result. If the circuits on the chip are widely disparate in kind and are wired together in an irregular pattern, the chances of failure are much higher than where the circuits are mostly of the same kind and are wired together in a regular fashion. The second source of wastage is in the actual design of the circuit logic. The complexity of the logic circuitry in a computer is such that it is not possible to predict with absolute accuracy the performance of the logic under all input conditions until the model is built and subjected to a wide range of tests. The results of these tests invariably lead to redesign of the logic circuitry, a complex task which has to be performed with as little interruption to production schedules as possible.

Besides the problems associated with production, there are problems of incorporating design changes when computers are in the hands of customers. Usually this necessitates the installation of new logical circuitry and the discarding of the old circuitry.

One approach to the solution of these problems is the programmable chip. A general purpopse chip is designed which can be adapted to perform any selected logic operation. Some such chips have data registers, the contents of which determine the logic operation to be performed by the chip. Logic changes can be easily made, simply by changing the data in the register by in general, such chips are irregularly wired and the problems of manufacture remain.

An electronic component which has sufficient regularity of structure to minimise production problems in the digital store which consists largely of arrays of bistable circuits. It has been suggested that stores can be adapted to serve as general purpose logic circuits by storing the required logic function as a table in the store and accessing the table by a table-look-up operation. Associative stores are particularly suited to table-look-up. Since the logic is merely stored data, logic changes can readily be made.

It is the object of the invention to provide an associative store particularly suitable for use as a general purpose logic component.

According to the invention an associative binary store comprises a fixed search field and a fixed read field, each consisting of bistable storage circuits, a binary input register and a binary output register, coding circuitry connected between the input register and the search field and decoding circuitry connected between the read field and the output register.

The invention will further be explained by way of example with reference to the accompanying drawings, in which.

Figure 1:
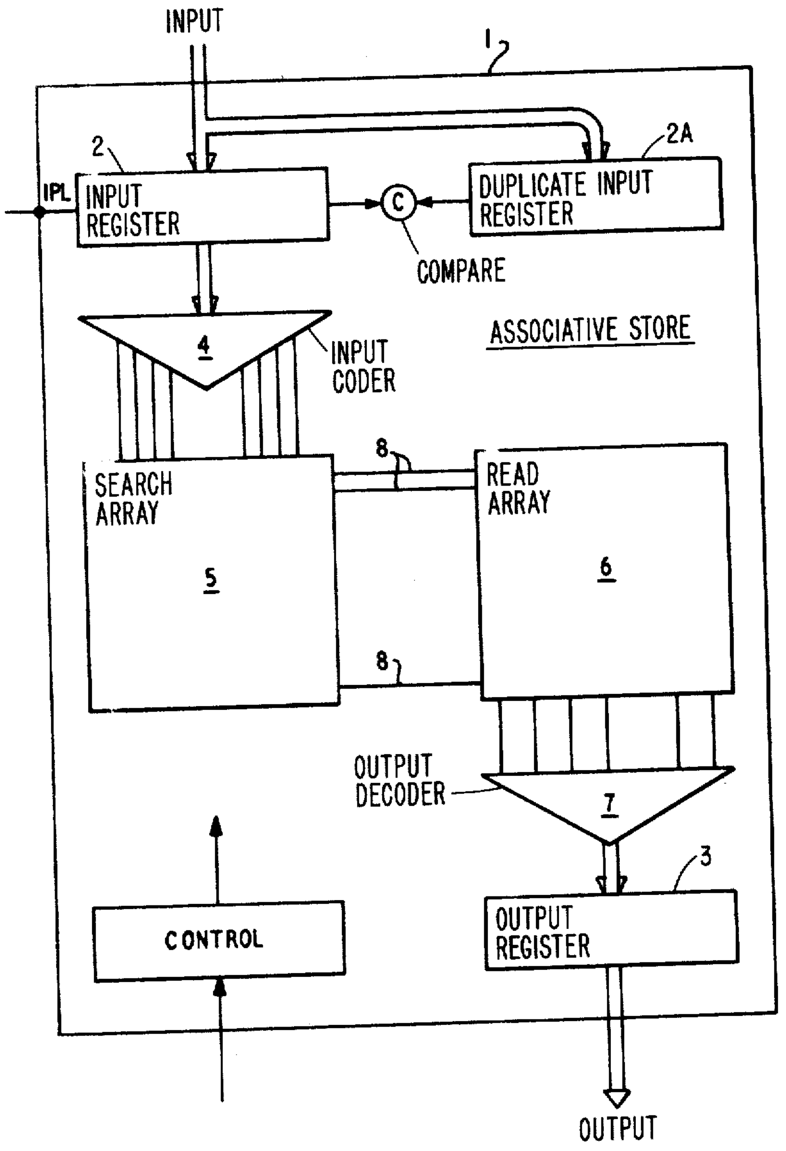
FIG. 1 is a block diagram of an associative store according to the invention.

Referring to FIG. 1, an associative store 1 according to the invention comprises an input register 2, an output register 3, an input coder 4 connected between the input register 2 and a search array 5, a read array 6 and an output decoder 7 connected between the read array 6 and the output register 3.

Also shown in a duplicate input register 2A connected to register 2 through comparison means C. Register 2A serves a dual purpose. It is used in checking the accuracy of data transmitted to register 2 from external sources by the checking technique of bus pair crossover described in the specification of our copending application (UK9-70-70-005). Since this technique is not directly relevant to the structure of the associative store according to the invention it will not further be described. Register 2A is also connected to register 2 to form the intermediate stages of a shift register. As is well known, some form of delay is necessary between the stages of a shift register to ensure accurate operation of the register. The bistables comprising register 2A are connected in known fashion to hold the data as it is shifted out of the bistables of register 2 and before transferring it back, shifted one position to the right, to register 2. A shift register constructed in this way is shown in R. K. Richards, Arithmetic Operations in Digital Computers (New York 1955) at pages 145, 146 and FIG. 5—5. The controls for effecting operation of registers 2 and 2A as a shift register as distinct from two separate registers are conventional and will be readily apparent to those skilled in the art. Since register 2A has the same number of bistables as register 2, at the end of a shift operation the contents of the two registers will be the same. The shift register is used in initially loading the associative store by way of conductor IPL (FIG. 1) as will be explained. Register 2A is not connected to the search array.

Data is stored in associative store 1 as binary words each comprising a search field stored in search array 5 and a read field stored in read array 6. Each bit of a work is connected to a work line 8 unique to the word. Corresponding bits of different words are connected to bit lines which are connected in the search field to the outputs of coder 4 and in the read field to the inputs of decoder 7. The basic operation defined on the store is Search-Read in which a search argument is placed in input register 2, coded by coder 4 and compared with the contents of the search fields stored in search array 5. The result of the comparison is signalled on the word line 8 and is used to cause readout of the read fields of those words of which the search field matched the coded search argument.

Other operations defined include Hold, in which the contents of the input register 2 are maintained unchanged and no operation takes place for a single store cycle, Emit, in which the contents of the input register 2 are tranferred directly to the output register 3, the store effectively acting as a one cycle delay, and Write, which, as explained later, is subdivided into a write operation into the search array and a write operation into the read array.

Figure 2:
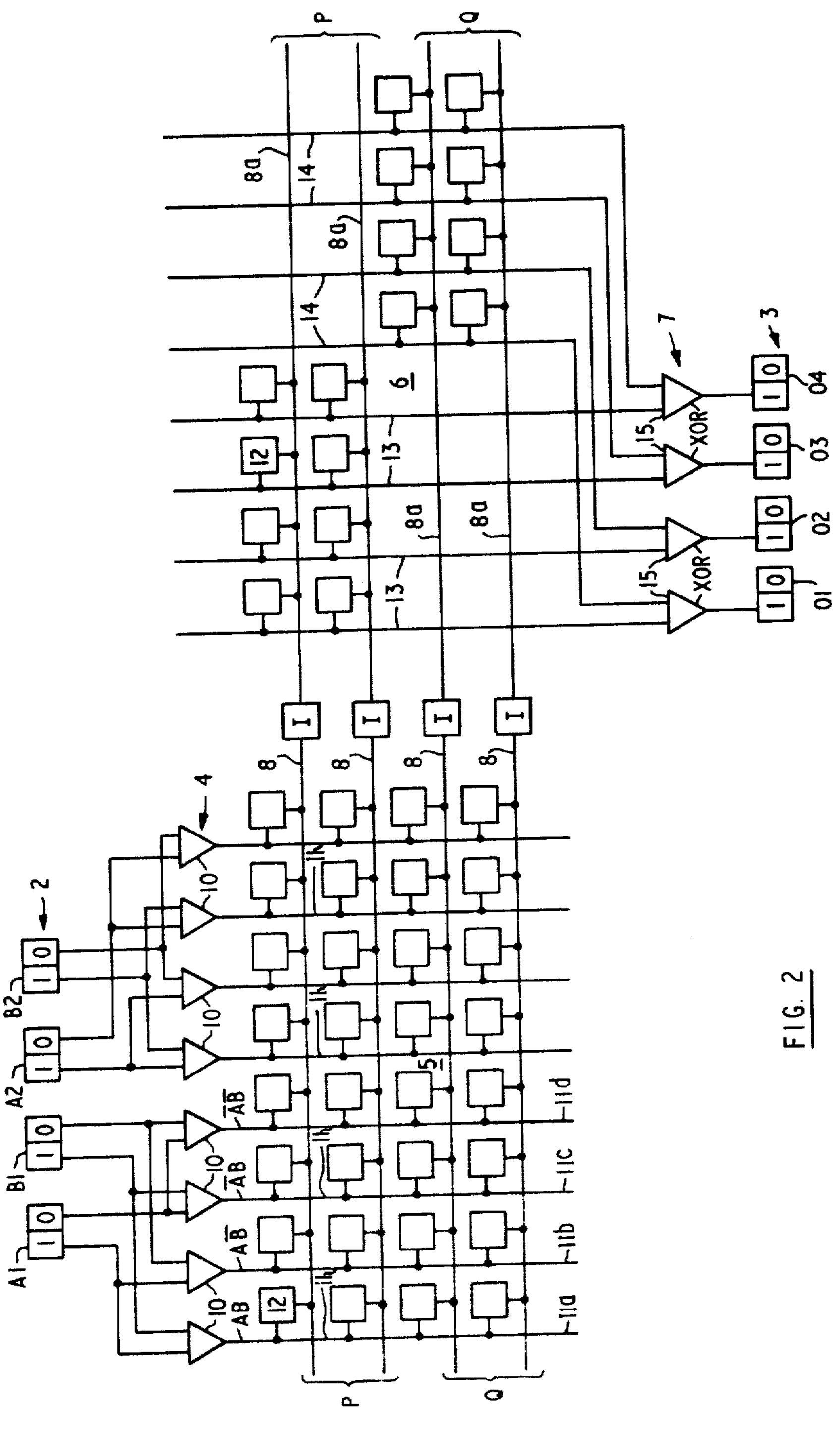
FIG. 2 is a more detailed block diagram of the store of FIG. 1.

Referring to FIG. 2, input register 2 compirses bistable circuits A1, A2, B1, B2. Decoder 4 consists of groups of and circuits 10 which decode the states of each pair of bistable circuits into a marking of one out of four bit lines 11 of the search field 8. Four columns of the search field 5 are thus associated with each pair of bistable circuits of the input register 2. A search word consists of bistable circuits 12 each connected to a different bit line 11 and to the same word line 8. A bistable circuit 12 is such that if the connected bit line 11 is marked a signal is generated on the connected word line 8 if and only if the bistable circuit 12 is in a given bistable state, the one state. Conversely, is the connected word line 8 is marked, the bistable circuit 12 generates a signal on the connected bit line 11 if and only if the circuit is in the one state. Further, if both the connected word and bit lines are marked, the bistable assumes the one state. A suitable known bistable circuit 12 will be described with reference to FIG. 3. The word lines 8 are connected to similar bistables 12 in the read field 6 through inverters I. Only if a word line 8 is not marked as a result of an associative search operation is the section 8*a* of the work line in the search field 6 marked with consequent read out of the search field. A mismatch occurs on a search operation, therefore, when a bit line 11 is marked and a bistable 12 connected to the bit line is in the one state.

The bistables 12 of associative store 1 are arranged in two arrays, called the P and Q arrays respectively. In FIG. 2, the P and Q arrays are shown, by way of example as consisting of two words each. In the search field 5, the P and Q arrays have common bit lines 11. By contrast, in the read field 6 the P and Q arrays have separate bit lines 13, 14, respectively. Output decoder 7 consists of a set of exclusive-or circuits 15 which have, as respective inputs, different bit lines 13 and 14. The outputs of the circuits 15 set respective bistables 01 to 04 of output register 3.

Figure 3:
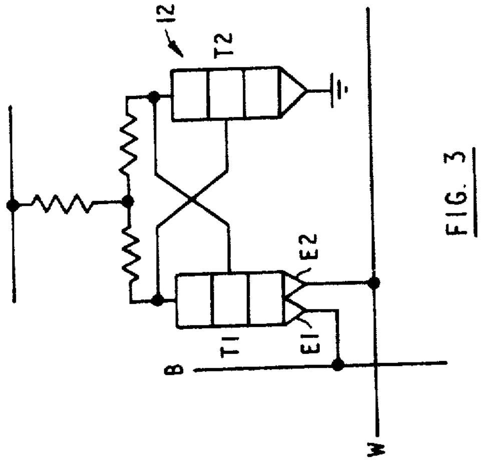
FIG. 3 is a circuit diagram of a transistor circuit suitable for use in the store of FIG. 1.

Referring to FIG. 3, a transistor bistable circuit suitable for use as a bistable 12 is shown. It is essentially half the four-state storage cell described in Specification 1,127,270 (England) and comprises a double-emitter transistor T1 with base and collector directly cross-coupled to collector and base, respectively, of a transistor T2, the emitter of which is grounded. One emitter E1 of transistor T1 is connected to a bit line B and the other emitter E2 is connected to a word line W. The circuit is in the one state with transistor T1 conductive. Depending on the relative potentials on the B and W lines, current flowing in T1 can be steered through E1 to the bit line (the read operation), through E2 to the word line (the mismatch signal), or the bistable can be set to the one state (the write operation). The circuit of FIG. 3 is only an example of one suitable bistable. Any bistable circuit can be used, especially such circuits as are most amenable to large scale integration.

Figure 4:
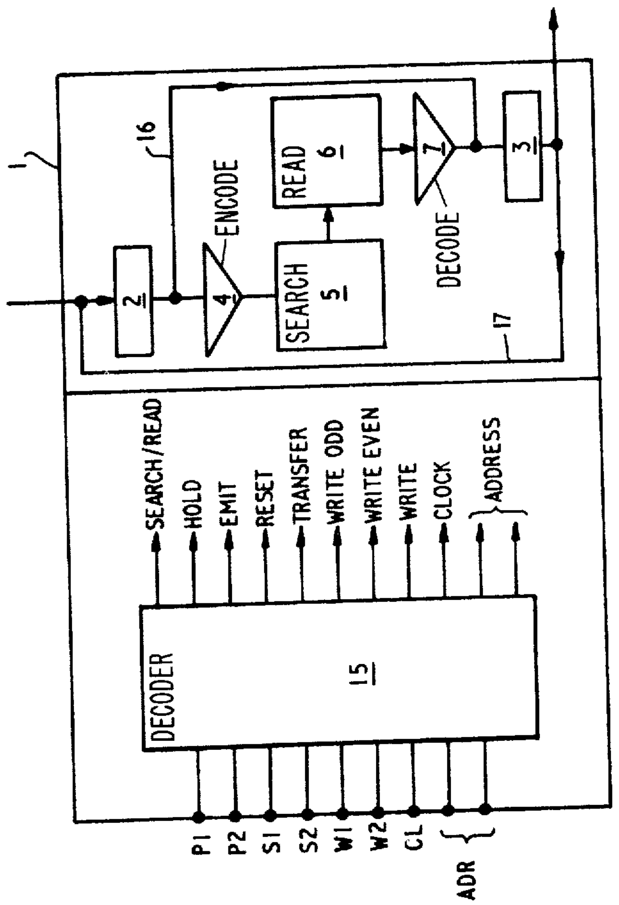
FIG. 4 is a diagram showing the commands used in driving the store of FIG. 1.

FIG. 4 is a diagrammatic representation of the associative store 1 showing the various operations which are defined on the store. A conventional decoder 15 interprets signals on terminals P1, P2, S1, S2, W1, W2, CL and ADR to generate one or more command signals to control the store. The command signals are d.c. potentials which are applied to conventional gating circuits (not shown) at the inputs or outputs of registers 2 and 3, or to the bit or word lines. Terminals P1 and P2 are the terminals normally used, and are called primary terminals. If 1 is used to represent that a terminal is marked and 0 that a terminal is not marked the following commands are generated by the decoder 15 as a result of signals of terminals P1 and P2;

P1 = 0, P2 = 0.

Search-Read. The basic associative operation. The contents of input register 2 are coded in coder 4 and the outputs of the coder compared with the contents of the search field 5. Where a match is found the contents of the read field of the matching word are read to the output register 3 through decoder 7.

P1 = 0, P2 = 1.

Emit. The contents of the input register 2 are tranferred to the output register 3 over path 16 (FIG. 4).

P1 = 1, P2 = 0.

Hold. The contents of the input register 2 are maintained unchanged. No other operation takes place.

P1 = 1, P2 = 1.

Write. The contents of the output register are selectively written into the read or search fields. The operation needs control signals on terminals W1 and W2 to be completely defined as will be explained.

The signals on secondary terminals S1 and S2 lead to the operation of the following commands.

S1 = 0, S2 = 0.

Use primary control. The signals on P1 and P2 are used to generate the commands.

S1 = 0, S2 = 1.

Emit and Reset. The contents of register 2 are transferred to register 3 over path 16. Register 2 is reset.

S1 = 1, S2 = 0.

Transfer. The contents of register 3 are tranferred over path 17 to register 2.

S1 = 1, S2 = 1.

Write. As for P1 = 1, P2 = 1.

In order to select a word location for writing in the search field a conventional addressing arrangement (not shown) is used. Address bits are supplied as binary signals to terminals ADR and provide inputs to a decoder (not shown) the output of which marks one word line 8. Since there are twice as many bistables 12 in the search field of a word as there are bit positions in the output register half must be selected. This is done by notionally dividing the search field into even and odd bistables 12. The odd bistables are the first, third, fifth etc. from the left as shown in FIG. 2 and the even bistables are the second, fourth, sixth, etc. from the left. The one outputs of the bistables 01 to 04 of register 3 are connected each to a different pair of bit lines 11 through gates which are enabled by the Write command and the decoded signals or terminals W1 and W2. Thus the one output of 01 is connected to bit lines 11*a* and 11*b*, the one output of 02 is connected to bit lines 11*c* and 11*d*, and so on.

Signals on terminals W1 and W2 are decoded as follows:

W1 = 0, W2 = 0.
No Write. A Write command on terminals P1, P2 or S1, S2 is suppressed.

W1 = 0, W2 = 1.
Write Odd. The signals on terminals ADR are decoded to mark a word line 8. Bit lines 11_a_, 11_c_ etc. are connected to the one outputs of 01, 02, etc. resulting in the writing of one into the odd bistables 12 of the selected word when the corresponding bistable 01 to 04 of register 3 stores a one.

W1 = 1, W2 = 0.
Write Even. As for Write Odd save that the bit lines 11_b_, 11_d_, etc. are connected to the one output of 01, 02, etc.

W1 = 1, W2 = 1.
Write Read Field. This is the inverse of Search Read. A word is selected by an associative search and the contents of register 3 written into the read field of the word.

The clock pulses will not be described in detail. A store cycle consists of only two phases, a data transfer phase during which the input register is free to receive data from an external source (except during a Hold operation) and the output register places its contents on a data bus, and a store operation phase. It should be noted that Search Read and Write Read field are continuous operations. The selected word is marked dynamically and operations such as Next or Previous as defined on some associative stores are not possible.

During normal operation of the associative store the controls are set to respond to signals on the primary terminals. The store can conveniently be controlled by microinstructions held in a control store. The number of control signals is not large and one microinstruction could control about ten associative stores 1. Special controls are required for loading the store and these will now be outlined. The control store would initially be loaded with a microroutine for controlling the associative store loading. It is common practice for load data to be stored on a disc and to be read serially into the data processing system when the system is switched on. We assume that there is some way of selecting individual stores from other stores. One such means is described in the specification of our copending application (UK9-69-029). Having stored the load microroutine in the control store all associative stores 1 in the system are tagged by writing into the search fields identifiers for each word in the store. The identifiers are stored on the disc and are supplied to the output registers of the stores by using input register 2 and input check register 2A as a 12 bit shift register fed from line IPL FIG. 1. The contents of register 2 are then transferred to register 3 by an Emit operation.

Finally by use of Write Odd or Write Even, the identifers are placed in the search field. Two of the associative stores are thus selected. The second store is used as a continuous check on the loading of the first store. Preferably the same second store is selected as each store is loaded The check is effected by comparing the contents of the output registers 3 of the two stores at the end of each cycle by conventional logic in the loading circuitry common to the system of stores.

Each word is loaded into the selected associative store as follows:

1. The contents of the read field of the word are shifted over line IPL to register 2.
2. Emit and Reset input. The read field is transferred to register 3 and registers 2, 2A are reset.
3. The tag is shifted into register 2.
4. A Write Read Array is executed.
5. Emit and Reset input clears the input register.
6. The data for the odd bistables of the search field is shifted into register 2 and Write Odd is executed. The word address is supplied from the control store.
7. The input register is cleared and 6 is repeated for the even bistables.
8. The search field is shifted into register 2 and a Search Read executed. A check word is shifted into register 2. The check word consists of what the read field should contain. As has been explained register 2A will contain the same data as register 2. A Transfer is executed which places the contents of register 3 in register 2. Comparator C then detects any difference between the result of the Search Read and the check word.
9. If step 8 is completed without comparator C emitting an error signal a series of test words is then supplied to register 2 in order to test the search field.

If at any stage in the loading process a hard error is found, i.e., an error which is not due to electrical transients and which repeats inspite of several retries, the search field of the word is loaded with ones which ensures a mismatch to any search argument, and the word is loaded into the next word location of the store. It is arranged that to each associative store there are several spare word locations. A count is maintained during loading of the number of word locations used and if the capacity of the store is exceeded it is isolated from the system and another store is loaded.

The sequence of test words are designed to check the accuracy of the search field as loaded. Accuracy can only be checked indirectly by comparing the register 3 contents of the two stores which have been loaded. If the output registers contain the same data it can be assumed that the same pattern of matches and mismatches have occurred in each store and that this is the intended pattern. The indirect checking is necessary because the test words do not necessarily select only the particular search field being tested. The first test word is designed to give a match output. Referring to FIG. 2, it will be seen that the four coded outputs of the and gates 10 connected to bistables A1 and B1 represent, respectively, $A.B$, $A.\bar{B}$, $\bar{A}.B$ and $\bar{A}.\bar{B}$. If the bistables 12 of the search field being tested contain the respective states W, X, Y and Z (the one state taking the value 1) then a search argument $A = \bar{W}.X + \bar{X}.Y$ and $B = \bar{Y} + \bar{W}$ will give a match. For example if the contents of bistables W, X, Y and Z represents the values 1,0,0,1 respectively, the search argument giving a match is $A = 0.0 + 1.0 = 0$, $B = 1 + 0 = 1$. The $\bar{A}.B$ output line of the decoder is marked and since the bistable 12 connected to this line is in state Y = O a mismatch signal does not issue. Of the remaining sequence of test words, the first two are designed to get mismatches and the third a match. First A is inverted, leaving B unchanged, and then B is inverted, leaving A unchanged, and then both A and B are inverted. For the four bit input register shown in FIG. 2, the test word sequence is as follows, with W1 to Z1 the contents of the bistables 12 connected to the bistables A1, P1 through decoder 4 and bit lines 11 and W2 to Z2 the contents of the bistables 12 connected in the same way to bistables A2, B2.

| | |
|---|---|
| $A1 = \overline{W1}.X1 + \overline{X1}.Y1$ | $B1 = \overline{W1} + \overline{Y1}$ |
| $A2 = \overline{W2}.X2 + \overline{X2}.Y2$ | $B2 = \overline{W2} + \overline{Y2}$ |

Test Word 1: A1 B1 A2 B2 should give match. The remaining test words, save for word 7, should give mismatch.

| | | | | |
|---|---|---|---|---|
| Test Word 2: | $\overline{A1}$ | B1 | A2 | B2 |
| Test Word 3: | A1 | $\overline{B1}$ | A2 | B2 |
| Test Word 4: | A1 | B1 | $\overline{A2}$ | B2 |
| Test Word 5: | A1 | B1 | A2 | $\overline{B2}$ |
| Test Word 6: | $\overline{A1}$ | $\overline{B1}$ | A2 | B2 |
| Test Word 7: | A1 | B1 | $\overline{A2}$ | $\overline{B2}$ |

The pattern of test words, as has been shown, can be generated from simple formulae so that it is unnecessary to write the test words on the loading disc. The test words can be generated by the load program.

Having described, the structure and loading of an associative store according to the invention describe now described how it can be used as a logic circuit.

Figures 5, 6:
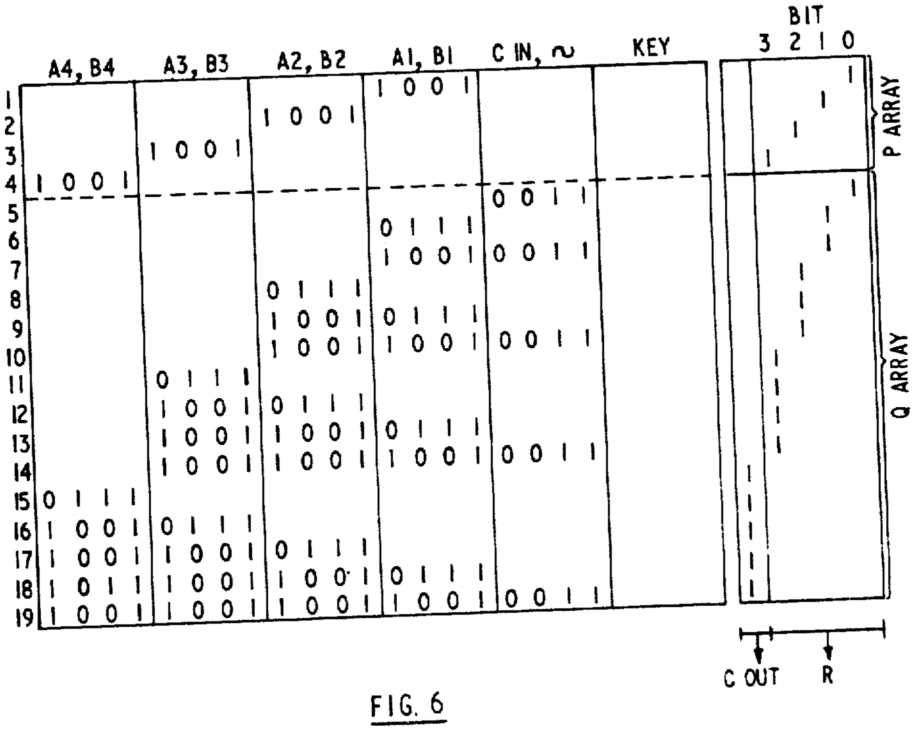
FIG. 5 is a table explanatory of the use of the input coder.
FIG. 6 is an example of a function table.

First we consider the search field. Referring to FIG. 5 the four columns headed 'Search Argument' represent the 16 possible states of the four bistables 12 connected to the four outputs of decoder 4 associated with a single pair of input bits A and B. The one state is represented by 1. A mismatch occurs if the function at the head of a column is true and the associated bistable is in the one state. For example if A = 1 and B = 1, A.B = 1 and a mismatch is generated if the bistable 12 in the first column (bit-position) from the left is in the one state (see also FIG. 2). Considering some of the functions in more detail, if all the bistables 12 hold 0 then a mismatch is not possible and the values of the bits A and B cannot affect the result of the search. Conversely, if all the bistables 12 hold 1 a mismatch always occurs and the word can never be accessed. This function has already been described for 'deleting' bad word locations from the store during loading. If it is required to access a word in response to the function A equivalent to B, then the bistables connected to the decoder outputs $A.\overline{B}$ and $\overline{A}.B$ are set to 1. $A.\overline{B}$ or $\overline{A}.B$ are true if and only if A is not equivalent to B and a mismatch will result then.

It can be seen from the table that all sixteen functions of two binary inputs are possible. This makes the input decoder a powerful tool for operating on two binary operands by table-look-up.

The read array consists of the search fields of words arranged in two arrays, P and Q, corresponding bit positions of words in the respective arrays being the respective inputs of an exclusive-or circuit in output decoder 7. It should be noted that the contents of the read field are completely independent of the search field. When a table is for the performance of an arithmetic or logic operation, the most usual requirement is that the output be the result of the operation but this is not necessarily so. The read field could for example contain data which is interpreted as control signals in an industrial process. If A is equivalent to B then generate alarm signals or cause printer carriage return, are examples of non-arithmetic functions.

As an example of an arithmetic function, FIG. 6 shows the contents of an associative store according to the invention arranged to generate the sum and carry out C out of two four-bit operands A1 to A4 and B1 to B4 with a carry in C in. Correspondingly ordered bits of the operands are arranged as bit-pair inputs to respective groups of four and circuits of the coder 4. Carry in C in is the A bit of a fifth bit-pair and a sixth bit-pair (not shown) generates the key (not shown) which identifies the table. The table consists of 19 words so arranged that words 1 to 4 have read fields in the P array and words 5 to 19 have read fields in the Q array. Blanks in the table represent bistables in the zero state. Some zeros have been shown to clarify the diagram.

Words 1 to 4 generate (cause the read-out of) result one bits if one and only one of the corresponding operand bits is one. The search argument is the exclusive-or function as shown in FIG. 5 and the read field contains a 1 in the appropriate bit column. The words with read fields in the Q array are arranged to cancel the result one bit if necessary or to supply a result one bit if A XOR B is not true but other conditions. For example, line 5 detects the presence of carry-in. If A XOR B is true for A1, B1, (line 1 selected) and C in is true (line 5 selected) the bit O result bit should be zero. With both lines 1 and 5 selected the XOR circuit at the bit 0 output of the read field has ones on both inputs and zero is the resultant output. If only line 5 is selected only one of the inputs to the XOR circuit is one and the bit 0 result is one. Lines 6 and 7 detect the conditions for carry-in to result bit 1 and cancel the effect of line 2 if necessary. In fact lines 6 and 7 perform the same function for the bit pair A2, B2 as line 5 does for A1, B1. Similarly, lines 8 to 10 detect carry-in to A3, B3 and lines 11 to 15 detect carry-in to A4, B4. Finally lines 15 to 19 detect conditions for a carry-out.

It will be seen from consideration of the table described above that an associative store according to the invention enables remarkable compression of function tables, in the search field by means of the coder and in the read field by means of the output decoder.

The invention can also be implemented as a read-only store. In this respect the term "bistable" is to be interpreted as a two-state connection between bit and word lines. In the "one" state there is a unidirectional electrical connection between a bit and a word line, as through a diode or the collector-emitter path of a transistor. In the "zero" state the bit and word lines are electrically isolated from each other at a storage position of the read-only store. Apart from the exclusion of the write operations control of a read-only associative store according to the invention is as described for the writeable store. The design of one suitable kind of read-only associative store is described in the paper 'Structured Logic' by R. A. Henle et al., Proceedings Fall Joint Computer Conference 1969, pp. 61 to 67.

What we claimed is:

1. An associative binary store comprising a fixed search field and a fixed read field, each consisting of bistable storage circuits, a binary input register and a binary output register, coding circuitry connected between the input register and the search field and decoding circuitry connected between the read field and the output register.

2. A store as claimed in claim 1, wherein each bistable is connected only to one of a plurality of word lines, each search field bistable is further connected only to one of a plurality of search bit lines, and each read field bistable is further connected only to one of a plurality of read bit lines.

3. A store as claimed in claim 2, wherein the search bit lines are connected in exclusive groups to the coding circuitry which is arranged to mark one bit line out of each group in accordance with the contents of predetermined sets of bit positions of the input register, there being a different set of bit positions associated with each group of bit lines.

4. A store as claimed in claim 3, wherein each group is four search bit lines and each set is two bit positions.

5. A store as claimed in claim 2, wherein there are two sets of read bit lines and the decoding circuitry comprises a plurality of exclusive-or circuits, the respective inputs to each exclusive-or circuit being a read bit line from each set.

6. A store as claimed in claim 1 wherein the output register is so connected as to enable the contents thereof to be written into the search field or the read field.

7. An associative binary store having a search array; a read array, each array having transversely oriented input and output lines, output lines in said search array connected to input lines in said read array, each array consisting of an array of storage elements and logic elements for selectively connecting said input and output lines in the respective arrays in accordance with stored signals in said storage elements;

the improvement comprising:

an input encoder for connecting input binary signals to coded signals and means in said encoder for supplying said coded signals to said input lines of said search array;

and an output decoder connected to said output lines of said read array for connecting output coded signals to output binary signals.

* * * * *